United States Patent [19]

Volk et al.

[11] Patent Number: 4,719,805
[45] Date of Patent: * Jan. 19, 1988

[54] DRY FLOW SENSOR WITH AUTOMATIC SPEED COMPENSATION AND TOTALIZER CIRCUIT

[75] Inventors: Joseph A. Volk, Chesterfield; Joseph A. Volt, Jr., Florissant, both of Mo.; Chusak Tansuwan, Los Altos, Calif.

[73] Assignee: Beta Raven Inc., Earth City, Mo.

[*] Notice: The portion of the term of this patent subsequent to Oct. 1, 2002 has been disclaimed.

[21] Appl. No.: 734,620

[22] Filed: May 16, 1985

Related U.S. Application Data

[63] Continuation-in-part of Ser. No. 560,187, Dec. 12, 1983, Pat. No. 4,538,471, which is a continuation-in-part of Ser. No. 479,252, Mar. 28, 1983, Pat. No. 4,543,835.

[51] Int. Cl.⁴ .......................... G01F 1/86; G01F 1/30
[52] U.S. Cl. ............................ 73/861.03; 73/861.73
[58] Field of Search ........... 73/861.73, 861.04, 861.25, 73/861.03, 861.02, 861.71, 861.06

[56] References Cited

U.S. PATENT DOCUMENTS

| | | | |
|---|---|---|---|
| 3,595,078 | 7/1971 | Beck et al. | 73/861.04 |
| 3,635,082 | 1/1972 | Prellwitz et al. | 73/861.04 |
| 3,802,261 | 4/1974 | Zimmerman et al. | 73/861.03 |
| 3,822,377 | 7/1974 | Beck | 73/861.03 X |
| 4,183,245 | 1/1980 | Connery et al. | 73/861.25 |
| 4,261,196 | 4/1981 | Scheid, Jr. | 73/861.04 X |
| 4,402,230 | 9/1983 | Raptis | 73/861.04 |
| 4,413,531 | 11/1983 | Karplus et al. | 73/861.25 |
| 4,540,946 | 9/1985 | Sainz et al. | 73/861.25 X |
| 4,543,835 | 10/1985 | Volk, Jr. et al. | 73/861.73 |

FOREIGN PATENT DOCUMENTS 2950925 11/1980 Fed. Rep. of Germany ... 73/861.73

OTHER PUBLICATIONS

"Ultrasonic Properties of Coal Slurries and Flow Measurements by Cross Correlation", *IEEE Transastions on Sonics and Ultrasonics*, vol. 50-28, No. 4, (Jul. 1981).

Primary Examiner—James L. Rowland
Assistant Examiner—Brian R. Tumm
Attorney, Agent, or Firm—Rogers, Howell, Moore & Haferkamp

[57] ABSTRACT

An ultrasonic speed sensor produces a linear voltage directly proportional to the speed of material falling through a chute and contacting a plate. A transducer coupled to the plate produces a second linear voltage which is directly proportional to the force applied to the plate by the material as it impacts the plate. An electronic dual slope integrator circuit combines these two linear DC voltages to produce a digital pulse output whose frequency is directly proportional to the flow rate of the material. The digital pulse output may be used to drive a totalizer which totals the amount of material flowing through the chute, and an indication meter to provide an instantaneous readout of the flow rate.

33 Claims, 10 Drawing Figures

DRY FLOW SENSOR WITH AUTOMATIC SPEED COMPENSATION AND TOTALIZER CIRCUIT

BACKGROUND AND SUMMARY

This application is a continuation-in-part of Ser. No. 06/560,187 filed Dec. 12, 1983, now U.S. Pat. No. 4,538,471, which is a continuation-in-part of Ser. No. 06/479,252 filed Mar. 28, 1983, now U.S. Pat. No. 4,543,835.

Devices for measuring the flow rates of powdery and granular materials as they flow through a gravity flow system are well known in the art. Some of the inventors herein are also the inventors of U.S. Pat. No. 4,069,709 which discloses such a device. Another dry flow sensor device is disclosed in U.S. Pat. No. 3,640,135. These patents disclose devices which generally include an inclined plate which is placed in the flow path of the material to be metered, a mechanical spring means of some sort to resist movement of the plate, and a transducer mechanically coupled to the plate to produce an electronic signal proportional to plate deflection which may be amplified and displayed to provide a measurement of the sensed rate of flow of the material. These particular prior art devices require deflection of the plate to produce a measurement of the flow rate, and a mechanical spring action which resists movement of the plate such that the resisting force is linearly related to the magnitude of the plate deflection. Furthermore, these systems are "open loop" systems in the sense that there is no feedback which compares the measured flow rate with the position of the plate to correct for errors in measurement. Instead, the linear deflection is measured by a transducer and translated into a flow rate.

The inventors are also aware of a German Pat. No. 2950-925 which discloses a dry flow sensor as is disclosed in the U.S. patents mentioned above, with the further feature of a turbine wheel mounted immediately below the plate and positioned so that material flowing off the plate turns the turbine wheel to generate a signal proportional to the speed of the material as it exits the dry flow sensor. The German reference teaches that the force measurement against the plate by the material may not accurately represent the true flow rate of the material in that errors can be induced due to the frictional coefficient of the material as it slides along the plate. For example, a change of humidity can cause a change in the frictional coefficient such that the material has a tendency to stick to the plate and slow down as it exits the plate. Still another error can be introduced through a change in the particle size which causes a variation of direction of the material after it bounces off the plate. This German reference includes the turbine wheel to measure the variations caused by these phenomena and produces a signal which can be combined electronically to correct the force measurement to obtain a more accurate flow rate indication.

Some of the inventors herein are also the inventors of the inventions disclosed in the parent applications mentioned above. These inventions include a speed sensor, which may be ultrasonic, which is a non-contact speed sensor positioned to measure the speed of the material prior to its exiting the plate to compensate for the difference in speed of the material as it falls against the plate. It is believed that the speed of the material is inversely proportional to the flow rate while the force applied to the plate by the falling material is directly proportional to the flow rate. In other words, two streams of material may have the same flow rate even though one may generate a greater force measurement against the plate merely due to a greater speed of the material as it hits the plate. Thus, for constant speeds, a greater force measurement against the plate should equate to a greater flow rate. However, the force against the plate may be the same for different flows but if the speed of one flow is greater than the speed of another flow, then the flow having the greater speed has the lower flow rate.

Some of the inventors herein have previously succeeded in developing an invention to measure the speed of the falling material, and using the speed signal to compensate the force signal and arrive at a speed compensated force signal which more accurately represents the actual flow rate of the material as it flows through the dry flow sensor. These prior inventions include adding speed compensation to both the plate type dry flow sensor mounted in a chute as evidenced by the prior U.S. patent applications mentioned above, and a second inventive design of a dry flow sensor for use in a "dead end" turn as is disclosed more completely in one of the parent applications mentioned above, the disclosures of which are incorporated herein by reference.

To further implement the speed compensation of the force signal in the dry flow sensor environment, the inventors herein have succeeded in developing a particularly unique and elegantly simple circuit which amplifies the force and speed signals, combines them with a dual slope integrator circuit, and produces a series of digital pulses whose frequency is directly related to the flow rate of the material as it traverses the dry flow sensor. This circuit includes means to separately amplify and condition each of the force signal and speed signal, these signals typically being DC voltage signals. The force signal is then fed through an electronic switch to a dual slope integrator which integrates the force voltage in alternating directions, positive and negative. The output of the integrator is compared with the amplified speed voltage, and as the integrated force voltage reaches substantially the amplified speed voltage or a nominal 0, a comparator changes stage to switch the electronic switch and change the integrator from a positive to negative integration mode, or vice versa. The comparator also is used to generate a pulse each time that it changes state in response to the dual slope integrator, and these pulses are amplifed and used to drive two optocoupled output devices for purposes of producing an output signal consisting of a stream of digital pulses whose frequency is directly proportional to the speed compensated flow rate of the material as it traverses the dry flow sensor. This output signal can be fed to a totalizer for totalizing the amount of material fed through the dry flow sensor for any given run, and also may be output to an indicating meter for a visual indication to an operator of the instantaneous flow rate of the material.

The inventors herein have also succeeded in designing an ultrasonic speed sensor which generates an output voltage linearly related to the speed of the material. This ultrasonic speed sensor circuit includes a transmitter portion which includes a dual stage oscillator to drive a quartz crystal to generate an ultrasonic signal for reflection against the material, and a receiver circuit including a quartz crystal receiver with an amplifier circuit to amplify the signal, a detector to detect the low frequency variations in the received signal caused by the speed of the material, a filter to separate these low frequency variations, and a frequency to voltage converter to produce an output voltage with an amplitude that varies in proportion to the sensed speed of the material. It has been found that for this particular application, ultrasonic motion detectors commonly used in home burglar alarm systems and commercially available as such contain the transmitter and receiver circuits which can be utilized in this particular application. However, the inventors have uniquely adapted the circuits and applied them to the dry flow sensor environment to produce the unexpected result of generating a voltage which is directly proportional to the speed of the material as it flows through the dry flow sensor.

The foregoing represents a brief description of some of the principal advantages and features of the invention disclosed herein. A more thorough understanding of the invention may be gained from referring to the drawings and the detailed description of the preferred embodiment which follows.

DETAILED DESCRIPTION OF THE PREFERRED EMBODIMENT

Figure 1:
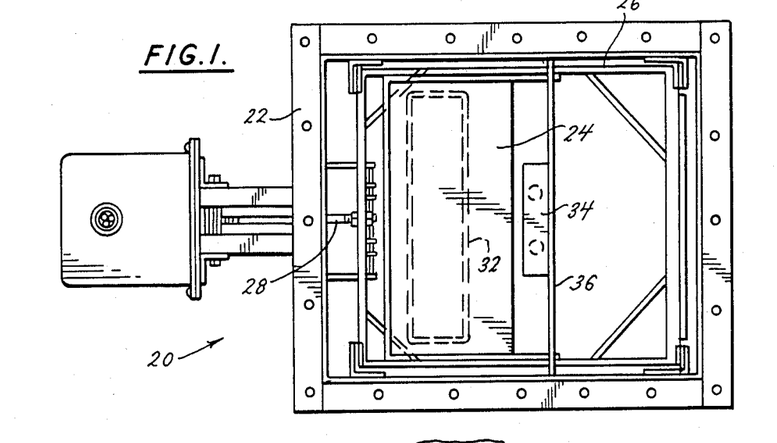
FIG. 1 is a top view of a typical chute type dry flow sensor with an ultrasonic speed sensor mounted along a cross bar.
Figure 2:
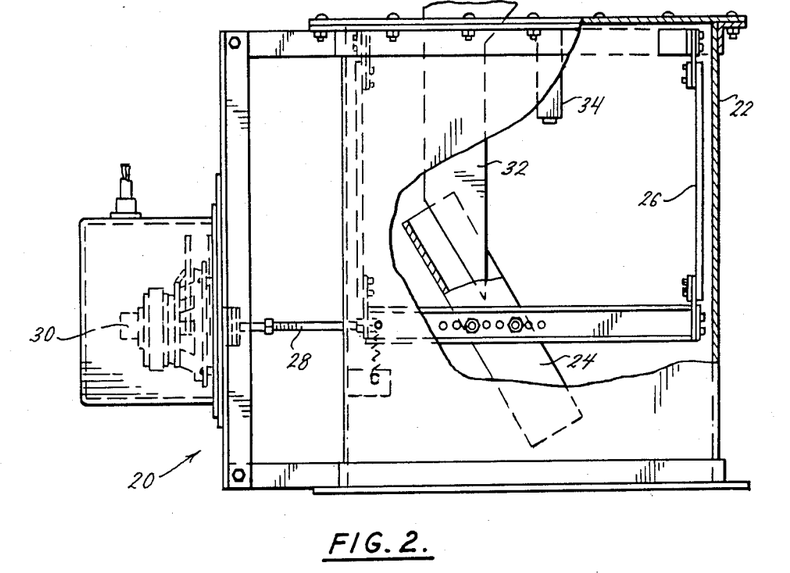
FIG. 2 is a side view of the dry flow sensor of FIG. 1 further detailing the mounting of the ultrasonic speed sensor.

As shown in FIGS. 1 and 2, a typical dry flow sensor 20 includes a chute 22, a plate 24 suspended in the chute by a suspension 26, with an actuator rod 28 coupled to the plate 24, the rod 28 actuating an electrical transducer 30 as material flows through a downspout 32 and impacts the plate 24. An ultrasonic speed sensor 34 is mounted to a cross bar 36 and is pointed directly at the material as it slides off the plate 24. Thus, in this particular arrangement, the ultrasonic speed sensor 34 senses the speed of the material prior to its leaving the plate 24.

Figure 3:
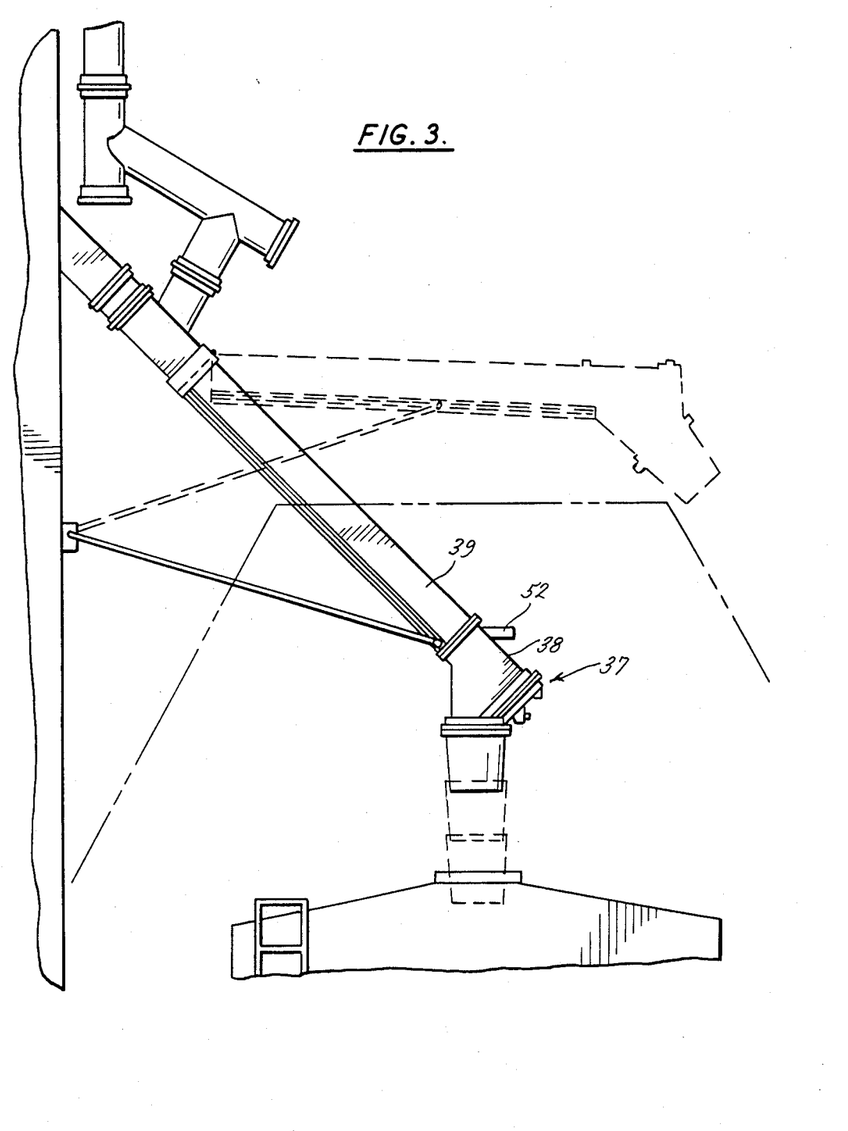
FIG. 3 is a side view of a "dead end" turn dry flow sensor with an ultrasonic speed sensor mounted to the downspout.
Figure 4:
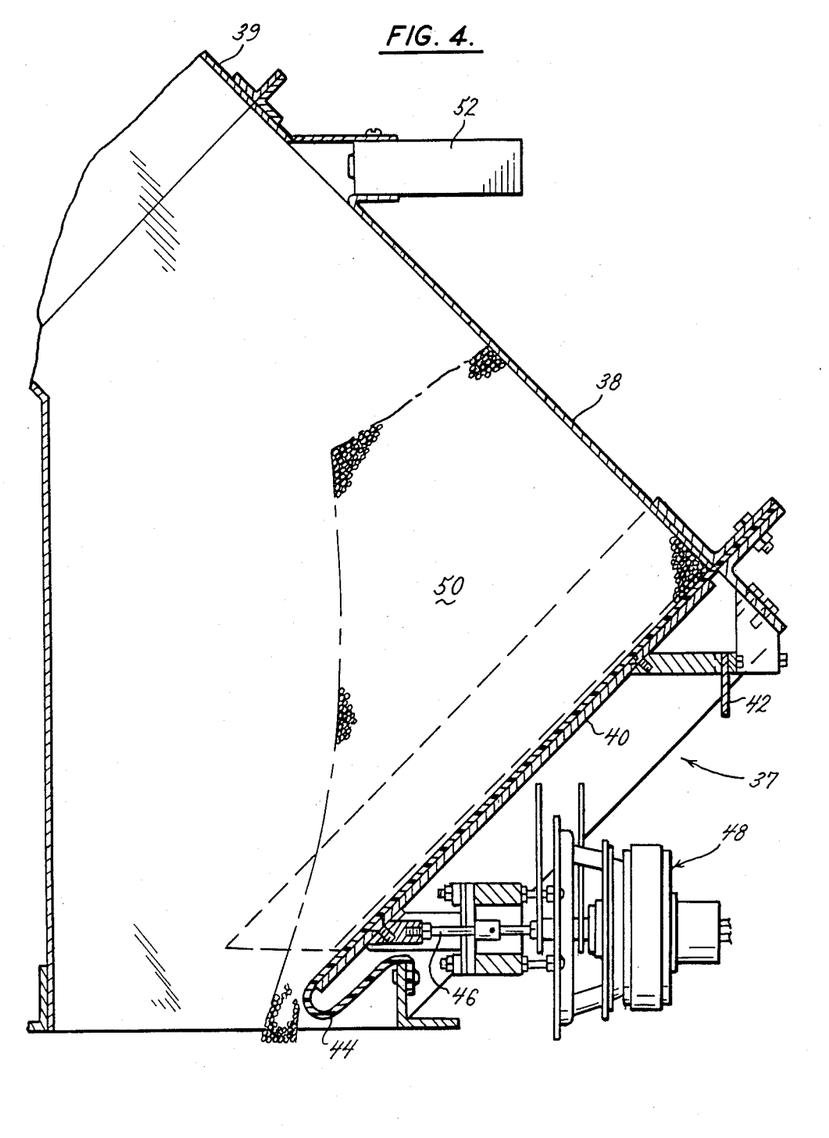
FIG. 4 is a partial cross-sectional view of the dry flow sensor further detailing the mounting of the ultrasonic speed senor.

Referring now to FIGS. 3 and 4, still another dry flow sensor 37 is shown as would be used in a "dead end" turn 38 in a downspout 39. It includes a plate 40 suspended by a plurality of leaf springs 42 and covered by a flexible plastic sheet 44, the sheet being bolted to the "dead end" turn 38. As in the other dry flow sensor embodiment 20, an actuator rod 46 is coupled between the plate 40 and an electronic transducer 48 to sense the force imparted to the plate 40 by the grain 50 as it traverses the "dead end" turn 38. An ultrasonic speed sensor 52 is shown mounted in the "dead end" turn 38 and is aligned to sense the speed of the material as it slides down the downspout 39 and before it impacts either grain 50 or the plastic sheet member 44. Thus, as shown in FIGS. 1-4, an ultrasonic speed sensor may be used to detect the speed of material as it flows through a downspout and before it contacts the plate or before it slides off the plate.

Figure 5:
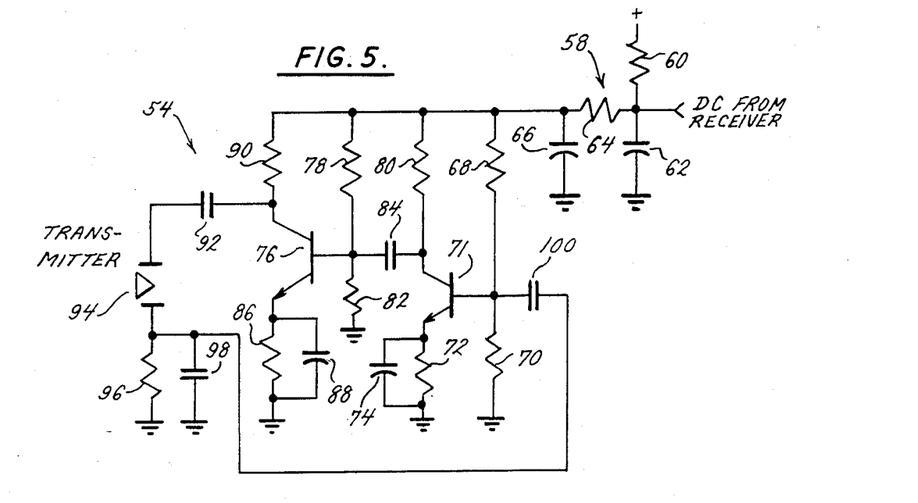
FIG. 5 is an electrical schematic of the transmitter portion of the ultrasonic speed sensor.
Figure 6:
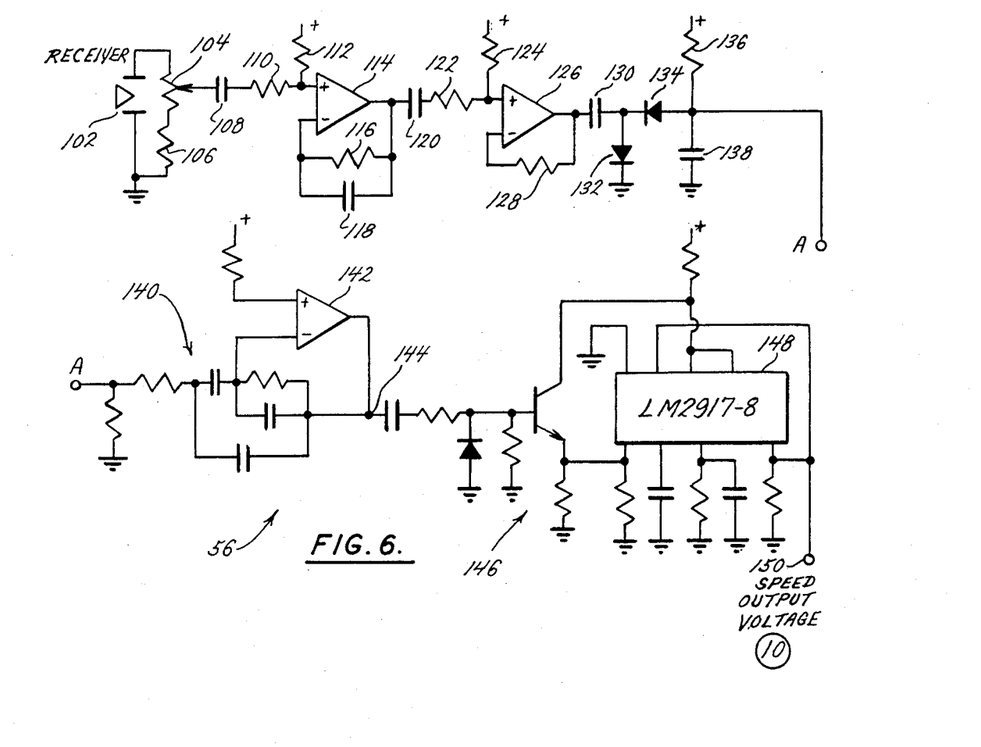
FIG. 6 is an electrical schematic of the receiver portion of the ultrasonic speed sensor.

The ultrasonic speed sensor 34, 52 includes both a transmitter 54, the electrical schematic for which is shown in FIG. 5, and a receiver 56, the electrical schematic for which is shown in FIG. 6. The transmitter 54 includes a decoupling filter 58 comprised of resistor 60, capacitor 62, resistor 64, and capacitor 66 which filters out any high frequency oscillations from the DC power used to provide power to both the transmitter 54 and receiver 56. An input voltage is developed across the resistor divider network comprised of resistors 68, 70 which is input to transistor 72, the output of which oscillates, as known in the art. Resistor 72 and capacitor 74 are connected in parallel between the emitter of transistor 70 and ground, and the collector of transistor 70 is connected to the input of a second stage oscillator transistor 76 through resistors 78, 80, 82 and capacitor 84. The emitter of transistor 76 has a resistor 86 and capacitor 88 connected between it and ground and a load resistor 90 connected to its collector. An input capacitor 92 provides AC coupling to crystal 94, with resistor 96 and capacitors 98, 100 providing feedback to the first stage amplifier transistor 70.

The receiver includes a matching quartz crystal 102 which receives the antennuated signal transmitted from crystal 94 and which is reflected from the flowing material to induce low frequency variations in the signal. An adjustable resistor 104 in series with resistor 106 provides an input signal which is filtered through an input circuit comprised of capacitor 108 and resistors 110, 112. A preamplifier 114 with feedback resistor 116 and capacitor 118 amplifies the received signal which is then input through a second filtering network comprised of capacitor 120 and resistors 122, 124 to an amplifier 126 with a feedback resistor 128. This amplified signal is then fed through a filter capacitor 130 to a peak-to-peak detector comprised of diodes 132, 134 and resistor 136 and capacitor 138. Its output is input to an active low pass filter 140 which includes as its active element an operational amplifier 142. The output of the active low pass filter 140 appears at node 144 which is then input into a standard frequency to voltage conversion circuit 146 which includes a chip 148 designated as an LM2917-8. The output of chip 148 appears at node 150 and is connected to terminal 10 of the dual slope integrator board shown in greater detail in FIG. 8.

Figure 7:
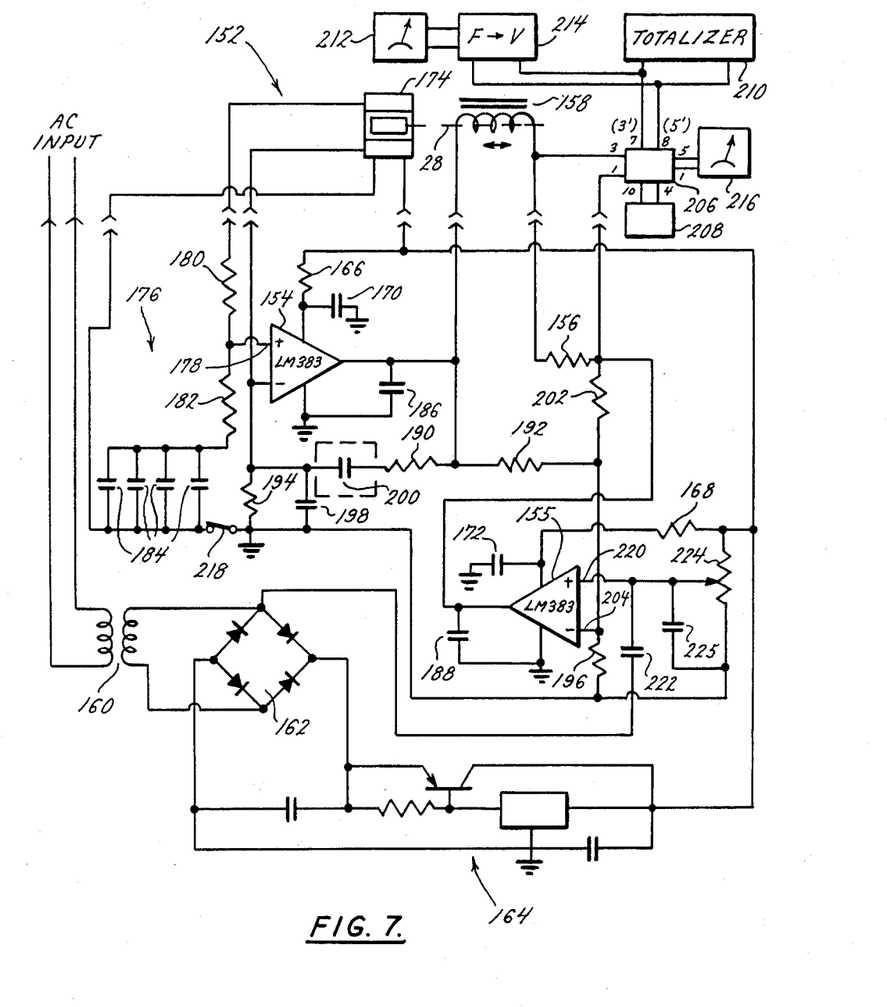
FIG. 7 is an electrical schematic of a typical dry flow sensor showing how the ultrasonic speed sensor is connected.

An electronic restoring force generating circuit 152 is shown in FIG. 7 which electronically generates the electrical signal required to energize one of the various electromagnetic force generators, or servos, to resist deflection of the plate 24. The electronic circuit 152 is essentially a bridge amplifiers circuit and includes a pair of differential amplifiers 154, 155 such as type number LM383, with a 5 ohm resistor 156 and, as shown in FIG. 7, an electromagnetic driver coil 158 with a nominal 4 ohm resistance connected in series between their outputs. A transformer 160 steps down the AC input voltage and feeds it to a full wave bridge rectifier 162, the output of which is supplied to a DC voltage regulator circuit 164, as known in the art. The output from the DC regulator 164 is connected through a pair of 0.18 ohm resistors 166, 168 and a pair of 0.2 microfarad capacitors 170, 172 to differential amplifiers 154, 155. These circuits decouple the AC component remaining in the output of the DC voltage regulator 164. A linear voltage transducer 174, or LVDT, is mechanically coupled through an actuator rod 28 to electromagnetic coil 158. The LVDT transducer 174 provides a voltage output across an input circuit generally designated as 176 to the positive input 178 of the left side differential amplifier 154. The input circuit 176 includes a 100k ohm resistor 180, a 2k ohm resistor 182, and several parallel connected 100 microfarad capacitors 184. The output of each differential amplifier 154, 155 has a 0.2 microfarad decoupling capacitor 186, 188, respectively. The output of amplifier 154 divides between a pair of 220 ohm resistors 190, 192, and a pair of 2.2 ohm resistors 194, 196. A 4500 microfarad capacitor 198 is connected in parallel with 2.2 ohm resistor 194, and an optional 9000 microfarad capacitor 200 may be provided between resistors 190, 194 when the circuit 152 is operated in an integrating mode to provide true servo action, as will be further explained below. A third 220 ohm resistor 202 is connected between coil 158, 5 ohm resistor 156, and a negative input 204 to amplifier 155. A dual slope integrator circuit 206 monitors the voltage across the 5 ohm resistor 156 to pick up the force signal and combines it with the velocity signal generated by a speed monitoring device 208 which monitors the speed of the granular material as it falls in chute 22. The compensated output of the dual slope integrator circuit 206 drives a totalizer 210, and an indicating meter 212 through a frequency to voltage converter 214. The dual slope integrator also provides a non-compensated signal output which can be used to directly drive a second indicator 216. A normally closed switch 218 is connected between resistor 182 and capacitors 184 and ground which permits that portion of the input circuit 176 to be disconnected from the input terminal 178 of amplifier 154, as desired. A full wave rectified AC signal from bridge rectifier 162 is connected to the positive input terminal 220 of amplifier 155 through a 0.1 microfarad capacitor 222. A 50k adjustable potentiometer 224 and a 1 microfarad capacitor 225 are used to set the DC and AC reference points for amplifiers 154, 155.

As explained more fully in the parent applications, the electronic restoring force generating circuit can be operated either as an electronic spring in that it requires some deflection of the actuator rod 34 to generate an output, or as a servo type circuit by the addition in the circuit of capacitor 200 so that amplifier 154 becomes an integrator to produce an output equal to the integral of the input applied at terminal 178. Additionally, there are other features of this electronic circuit 152 which make it uniquely adapted for use in a dry flow sensor application. However, for purposes of understanding the improvement disclosed and claimed in the present application, it is important to know only that the electronic circuit 152 generates an output voltage across resistor 156 which is directly proportional to the force applied to the plate 24 by granular material falling against it.

Figure 8:
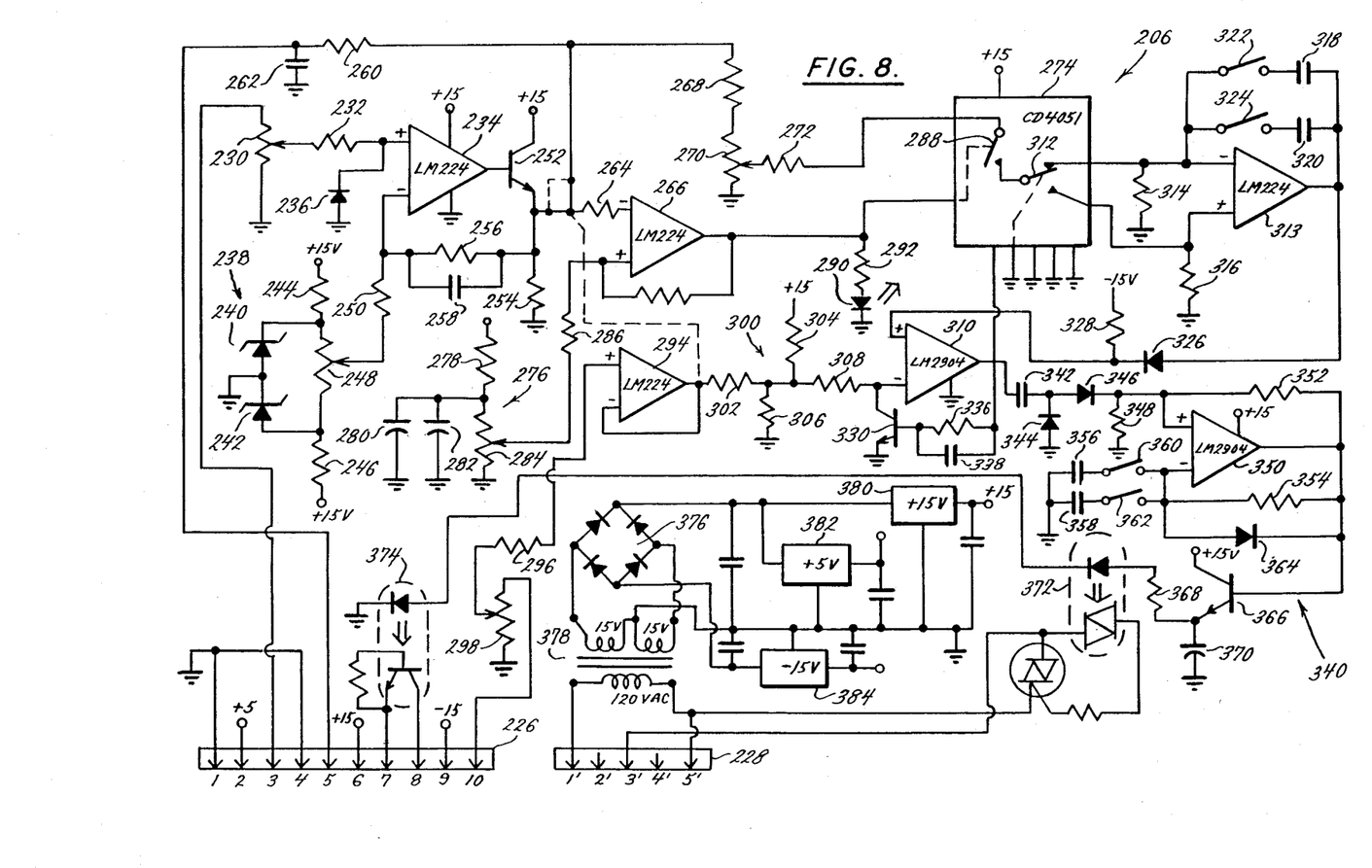
FIG. 8 is a detailed electrical schematic of the dual slope integrator circuit which combines the force signal with the speed signal to produce a compensated flow rate signal.

The dual slope integrator circuit 206 is shown in greater detail in FIG. 8 and includes a first terminal board 226 and a second terminal board 228 to facilitate connection of the integrator circuit 206 to the other electronic circuits shown and described herein. For example, the output of the electronic force generating circuit 152 is input at pin 3 of terminal board 226 across a 20k potentiometer 230 for input through resistor 232 to amplifier 234, which may be an LM224 type amplifier. Diode 236 connects between the positive input to amplifier 234 and ground to maintain proper biasing. The negative input to amplifier 234 is fed from a zero offset circuit 238 which includes zener diodes 240, 242, resistors 244, 246, 20k potentiometer 248 and resistor 250. Potentiometers 230, 248 provide the means to set the force signal at both a zero and high rate of flow to ensure accurate adjustment of the integrator circuit 206 for various flow rates. The output of amplifier 234 operates an emitter follower transistor 252 with load resistor 254, and feedback RC network comprising resistor 256 and capacitor 258. Thus, the voltage across resistor 254 is directly proportional to the force measured by the force generating circuit 152 of FIG. 7. This signal is output through an RC network comprising resistor 260 and capacitor 262 to terminal 5 of terminal board 226 for driving an indicating meter 216. Also, this force signal is input through resistor 264 to comparator 266, and through resistor 268, 20k potentiometer 270 and resistor 272 to an electronic switch 274, such as a CD4051. Potentiometer 270 provides a means to adjust the slope of the integrated force signal.

Referring back to comparator 266, a totalizer disable adjust circuit 276 is used to generate an input to the positive terminal of comparator 266 and includes resistor 278, capacitors 280, 282, 5k potentiometer 284 and resistor 286. With the totalizer disable adjust 276, an operator can adjust the disable or turn off point of comparator 266 for low flow rates which correspond to a low force voltage across resistor 254 as input via resistor 264 to comparator 266. When the output of comparator 266 is positive, i.e. indicating that the force voltage across resistor 254 is below the threshold voltage across the totalizer disable adjust circuit 276, switch portion 288 of electronic switch 274 is open which disables the electronic switch 274, and also LED 290 is engergized via resistor 292 to give a visual indication to the operator that the flow rates are too low to create a signal which will be totalized.

In an alternate embodiment using the connections shown by the dotted lines, the negative terminal of comparator 266 may instead be connected through resistor 264 to the output of comparator 294. The positive terminal of comparator 294 is connected through resistor 296 and 20k potentiometer 298 to terminal 10 of terminal board 226, the terminal which is connected to the speed output voltage labeled as 150 of FIG. 6. Potentiometer 298 provides a means to adjust the speed input signal. Thus, using this particular connection, the comparator 266 will be able to disable the electronic switch 274 for speeds of the falling material which are below a threshold value. From a practical standpoint, in this alternative connection, an operator will be unable to physically press against the plate to energize the totalizer as the totalizer will be disabled except when falling material is sensed by the speed sensor.

The output of the comparator 294 is connected back to the negative terminal thereof, thereby creating a voltage follower circuit which is divided by resistor network 300 comprised of resistors 302, 304, 306, and 308 before being input to comparator 310, as shown. The output of comparator 310 is connected to a second switch portion 312 of electronic switch 274 and toggles as comparator 310 changes state. The output of electronic switch 274 is connected to an integrator 313 which has input resistors 314, 316 and integrating capacitors 318, 320 with switches 322, 324 being used to determine the slope of the integration of integrator 313, as known in the art. The output of integrator 313 is fed through diode 326 to the positive input of comparator 310, with resistor 328 being used to ensure a zero volt bias to that side of comparator 310.

In operation, switch portion 312 stays closed, and integrator 313 integrates the force voltage until the voltage presented at the positive input to comparator 310 equals the instantaneous speed voltage input to the negative terminal of comparator 310. At that point, the comparator 310 changes its output state which switches switch portion 312 and which reverses the slope of the integrating process. The output of comparator 310 also turns on transistor 330 through resistor 336 and speed up capacitor 338 which drives the voltage at the negative terminal of comparator 310 to a nominal zero, i.e. the forward bias voltage of transistor 330. Thus, as switch portion 312 has changed state, the integrator 313 integrates the force voltage in the negative direction until it reaches a nominal zero, and then comparator 310 changes state to start the process all over again. Each time comparator 310 changes stage, its output drives a one-shot circuit 340 which includes capacitor 342, diodes 344, 346, resistor 348, amplifier 350, resistors 352, 354, capacitors 356, 358 with associated switches 360, 362 and diode 364. The one-shot circuit 340 drives transistor 366 with an RC network comprising resistor 368 and capacitor 370 which interfaces to an optocoupled triac 372 and an optocoupled transistor 374, both of which optocoupled devices 372, 374 drive outputs which can be selectably utilized to drive totalizer 210, as desired. Additionally shown is a full wave bridge 376 connected to an AC transformer 378 which is used to power the various power supplies 380, 382, 384 which develop the voltages required for integrator circuit 206.

Figure 9A:
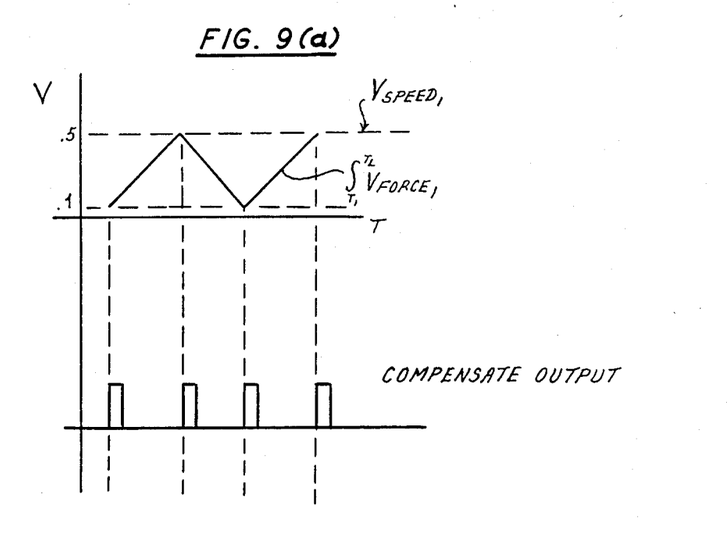
FIGS. 9(a) and 9(b) depict the timing relationship between the integrated force voltage, the threshold speed voltage, and the compensated digital pulse output.
Figure 9B:
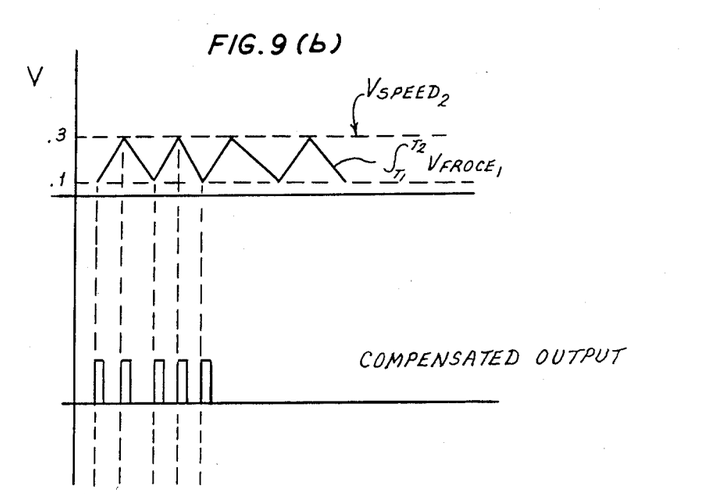

The operation of the dual slope integrator circuit of 206 can be more easily understood by referring to FIGS. 9(a) and 9(b). The concept of this invention is that the sensed speed of the falling material has an effect upon the force measurement made by the transducer connected to the plate of the dry flow sensor. Another way of putting it is that for equal force measurements made by the transducer, if the speed is lower, then the actual flow rate is higher, even though the force measurement taken alone would indicate the same flow rate of material through the chute. Referring now to FIG. 9(a), the dual slope integrator circuit uses the speed voltage to set a maximum threshold for the integrated force voltage. The slope of the integrated force voltage is directly proportional to the sensed force voltage. As further explained above, each time the comparator 310 senses that the integrated force voltage equals a nominal zero or the instantaneous speed voltage, it changes state to reset the electronic switch 274 and reverse the integration. Also, a one-shot circuit 340 produces a pulse each time the comparator 310 changes state. Therefore, as shown in FIG. 9(a), for a speed voltage of 0.5 volts, and a given force voltage, a compensated output is produced comprised of digital pulses with a given frequency. The frequency of the compensated output is thus directly proportional to the flow rate of the material.

As shown in FIG. 9(b), the same force measurement will produce a force voltage of the same magnitude which is integrated to have the same slope as that in FIG. 9(a). However, the speed voltage produced by the ultrasonic speed sensor is only 0.3 volts instead of 0.5 volts as in FIG. 9(a). This would correspond to a lower speed being sensed. As is apparent from the digital pulses representing the compensated output, the flow rate of the material is much greater, even though the same force is being applied to the plate by the falling material. Thus, the present invention senses not only the force applied by the material to the plate, but also the speed of the falling material, produces linear voltages which are each directly proportional to either the force or the speed, and then combines them to produce a digital pulse train whose frequency is directly proportional to the flow rate of the material, taking into account both the force and the speed of the material as it traverses the dry flow sensor.

There are various changes and modifications which may be made to applicants' invention as would be apparent to those skilled in the art. However, any of these changes or modifications are included in the teaching of applicants' disclosure and they intend that their invention be limited only by the scope of the claims appended hereto.

What is claimed is:

1. A dry flow sensor having means to measure the rate of flow of granular material through a chute, said dry flow sensor comprising a surface against which the flowing material impresses a force, means to measure the force applied to the surface by the material and produce a first signal, means to measure the speed of the material prior to its leaving the surface and produce a second signal, and means to combine said first and second signals to produce a third signal indicative of the flow rate of material through the chute, said first and second signals comprising amplitude sensitive signals and said third signal comprising a frequency sensitive signal.

2. The device of claim 1 further comprising means to disable said signal combining means output when said first signal is below a threshold value.

3. The device of claim 1 further comprising means to disable said signal combining means output when said second signal is below a threshold value.

4. The device of claim 1 wherein said signal combining means includes a dual slope integrator means.

5. The device of claim 4 wherein the dual slope integrator means has means to produce an integrated signal having a slope, said integrated signal comprising the first signal, and means to adjust the slope.

6. The device of claim 5 wherein the dual slope integrator means includes means to compare the integrated signal with the second signal and produce a pulse each time said integrated signal substantially equals said second signal, said pulses comprising the third signal.

7. The device of claim 6 wherein the dual slope integrator means includes means to produce a pulse each time said integrated signal substantially equals a nominal 0.

8. The device of claim 7 further comprising means to disable said signal combining means output each time said first signal is below a threshold value.

9. The device of claim 7 further comprising means to disable said signal combining means output each time said second signal is below a threshold value.

10. The device of claim 7 further comprising means to switch an AC signal in response to each pulse.

11. The device of claim 7 further comprising means to switch a DC signal in response to each pulse.

12. The device of claim 7 further comprising means to calibrate the first signal producing means, and means to calibrate the second signal producing means.

13. The device of claim 12 wherein the means to calibrate the first signal producing means includes means to set the output of the first signal producing means at a plurality of test points.

14. The device of claim 8 wherein the first signal producing means includes an operational amplifier having a pair of inputs, and further comprising a calibration means, the calibration means including a first voltage divider circuit connected to one of said inputs and a second voltage divider circuit connected to the other of said inputs.

15. The device of claim 8 wherein the disable means includes a comparator and a switch means connected to the input of the dual slope integrator means, the comparator having a pair of inputs, a voltage divider circuit connected to one of said inputs and the output of the first signal producing means connected to the other of said inputs so that said comparator closes said switch means to activate the dual slope integrator means only when the first signal is greater than the voltage developed across the voltage divider circuit.

16. The device of claim 9 wherein the disable means includes a comparator and a switch means connected to the input of the dual slope integrator means, the comparator having a pair of inputs, a voltage divider circuit connected to one of said inputs and the output of the second signal producing means connected to the other of said inputs so that said comparator closes said switch means to actuate the dual slope integrator means only when the second signal is greater than the voltage developed across the voltage divider circuit.

17. The device of claim 4 wherein the dual slope integrator means includes a switching means with its input connected to the first signal producing means and having a control lead, an integrator means having its input connected to the output of said switching means, and a comparator means with one of its inputs connected to the output of the integrator means, the other of its inputs connected to the second signal producing means and its output connected to a controllable switch means and also to the control lead of the switching means so that as the integrated value of the first signal substantially reaches the value of the second signal, the comparator means changes state to actuate the switching means and to actuate the controllable switch means connected to the other of its inputs and as the integrated value of the first signal substantially reaches nominal 0, the comparator means changes state to switch the electronic switch means and reset the controllable switch means.

18. The device of claim 17 wherein the signal combining means further comprises means connected to the output of the comparator means to produce a digital pulse each time the comparator means changes state.

19. The device of claim 18 wherein the signal combining means further comprises an LED and an optocoupled triac means connected to the digital pulse means to switch an AC voltage in response to each pulse.

20. The device of claim 18 further comprising an LED and an optocoupled transistor connected to the digital pulse means to change state in response to each pulse.

21. A dry flow sensor having means to measure the rate of flow of granular material through a chute, said dry flow sensor comprising a surface against which the flowing material impresses a force, means to measure the force applied to the surface by the material and produce a first signal, means to measure the speed of the material prior to its impacting the surface and produce a second signal, and means to combine said first and second signals to produce a third signal indicative of the flow rate of material through the chute, said first and second signals comprising amplitude sensitive signals and said third signal comprising a frequency sensitive signal.

22. The device of claim 21 further comprising means to disable said signal combining means output when said second signal is below a threshold value.

23. The device of claim 21 wherein said signal combining means comprises a dual slope integrator means, the dual slope integrator means having means to produce an integrated signal having a slope, the integrated signal comprising the first signal, and means to adjust the slope.

24. The device of claim 23 wherein the dual slope integrator means includes means to compare the integrated signal with the second signal and produce a pulse when said integrated signal substantially equals said second signal, and means to produce a pulse when said integrated signal substantially equals a nominal 0, said pulses comprising the third signal.

25. The device of claim 24 further comprising an output switch, said output switch being connected to the dual slope integrator means and acting in response to pulses produced by said dual slope integrator means.

26. The device of claim 25 further comprising means to disable said signal combining means output when said second signal is below a threshold value, said disable means comprising a comparator and a switch means connected to the input of the dual slope integrator means, the comparator having a pair of inputs, a voltage divider circuit connected to one of said inputs and the output of the first signal producing means connected to the other of said inputs so that said comparator closes said switch means to activate the dual slope integrator means only when the first signal is different from the voltage developed across the voltage divider circuit.

27. A dry flow sensor having means to measure the rate of flow of granular material through a chute, said dry flow sensor comprising a surface against which the flowing material impresses a force, means to measure the force applied to the surface by the material and produce a first voltage, means to measure the speed of the material prior to its leaving the surface and produce a second voltage, means to integrate the first voltage, comparator means to compare said integrated voltage with said second signal, said comparator means having means to reset the integrator means as said integrated signal substantially equals said second voltage and as said integrated signal substantially equals a nominal 0, and means to produce a digital pulse in response to the comparator means resetting the integrator means.

28. The device of claim 27 further comprising means to disable the digital pulse output means when said first voltage is below a threshold value.

29. The device of claim 27 further comprising means to disable the digital pulse output means when the second voltage is below a threshold value.

30. The device of claim 29 further comprising means to calibrate the first voltage producing means at a plurality of test points.

31. The device of claim 30 further comprising an LED and an optocoupled electronic switching means connected to the digital pulse means, said LED and optocoupled switching means having means to switch in response to each pulse produced by the digital pulse producing means.

32. A dry flow sensor having means to measure the rate of flow of granular material through a chute, said dry flow sensor comprising a surface against which the flowing material impresses a force, means to measure the force applied to the surface by the material and produce a first voltage, means to measure the speed of the material prior to its leaving the surface and produce a second voltage, and means to combine said first and second voltages and produce an output of a plurality of digital pulses with a frequency proportional to the flow rate of material through the chute.

33. The device of claim 32 further comprising means to inhibit the output of digital pulses when at least one of said first or second signals is below a threshold value.

* * * * *